Aug. 6, 1940.　　　　F. PENNELL　　　　2,210,096
COUPLING OR SPLICER
Filed June 12, 1939　　　　3 Sheets-Sheet 1

INVENTOR
Ford Pennell
BY　M. Fisher
ATTORNEY

Aug. 6, 1940.　　　F. PENNELL　　　2,210,096
COUPLING OR SPLICER
Filed June 12, 1939　　　3 Sheets-Sheet 2

INVENTOR
Ford Pennell
BY M. Fisher
ATTORNEY

Aug. 6, 1940.  F. PENNELL  2,210,096
COUPLING OR SPLICER
Filed June 12, 1939   3 Sheets—Sheet 3
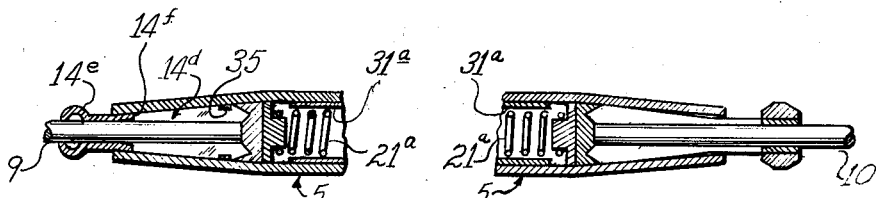
Fig. 13.   Fig. 12.
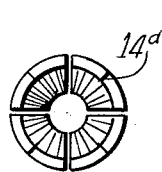 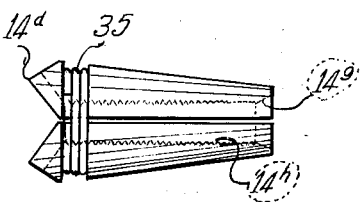 
Fig. 14.   Fig. 15.   Fig. 18.
 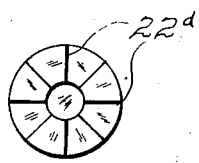 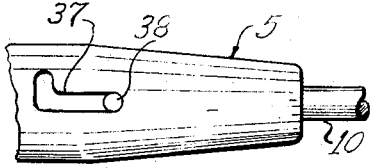
Fig. 16.   Fig. 17.   Fig. 19.
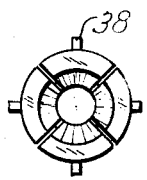 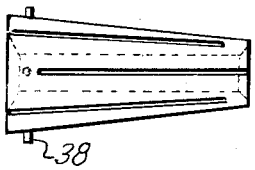 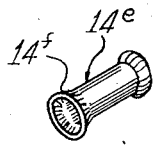
Fig. 20.   Fig. 21.   Fig. 22.
INVENTOR.
BY
ATTORNEY.

Patented Aug. 6, 1940

2,210,096

UNITED STATES PATENT OFFICE 2,210,096

COUPLING OR SPLICER

Ford Pennell, Webster Groves, Mo.

Application June 12, 1939, Serial No. 278,674

12 Claims. (Cl. 24—126)

This invention relates to couplings or splicers for connecting two wires in axial alignment, particular reference being made to the joining of electric service lines, or cables in tension.

One object of the invention is to provide a simple and practical splicer for axially joining two wires or wire ends so they cannot be pulled apart or accidentally separated in normal use, but may be readily separated or disjoined when desired, by inward push upon the wires, combined with manipulation of the parts, and without the use of picks or tools of any kind.

Another object is to provide a releasable wire splicer, comprising an elongated holder of tubular formation open from end to end, the bore being gradually enlarged from the ends towards the center, for forming interior, reversely turned conical sockets tapering out to the ends of the splicer or holder, with conic-sectional, axially bored wedge elements or chucks freely seated in the sockets of the splicer, the chucks comprising tapered, elongated conic-sections unitarily assembled, and preferably spring set together at their smaller tapered ends to normally tend to flare slightly asunder at their in-turned larger ends or butts, these ends being cupped or concaved, and a spring element located within the central portion of the elongated holder and compressed between the butts of the chucks or wedges to force them oppositely into their sockets for contracting their sections upon inserted wires, the smaller tapered ends of the chucks being dimensioned and lengthened so as to measurably protrude through the ends of the splicer, as means for manipulating the chucks, the ends of the press element being capped with convexed spreader caps adapted to press into the cupped or flared ends of the chucks for assisting in the flaring or expanding action of the sections, the caps being centrally recessed for receiving the ends of the splicing wires, so that should these ends be meshed, they would not interfere with the jaws closing firmly upon the wires, and whereby when the wire ends are pushed inwardly against the action of the spring the chucks or wedges will be also moved inwardly and the several sections thereof will expand or open either to receive or to release the wire ends, the chucks being meanwhile held to their inward positions by means of their protruded ends or other means.

Other objects of the invention are to provide, in a wire splicer of the kind referred to, means of forcing the chuck jaws open diametrically and to retain them open, to readily release the wires for salvaging the splicer; to provide a splicer having chuck jaws formed for a uniform and gradual gripping of the wires to prevent nicking of the wires where they enter the jaws, thus causing failure or breaking of the wires at the nick; to provide a splicer having a plurality of tapered gripping jaws freely located in its tapered ends, together with means for moving the jaws axially towards or from the tapered ends of the splicer, wthout the use of special or auxiliary tools.

The foregoing objects, as well as other objects and advantages are accomplished by means of the devices and expedients shown in the drawings as a part of this specification, and wherein:

Figure 10 is an enlarged detail of the nipple or connecting sleeve shown in Figure 9, showing also the coil expansion spring inserted there through.

Figure 12 is a longitudinal section through one end of a modified form of splicer assembly, showing certain structural modifications.

Figure 13 is a longitudinal section through one end of another, modified form of splicer showing additional structural changes.

Figure 14 is an end view of one of the chuck-jaw assemblies as shown in Figure 12.

Figure 15 is a side view of the assembly shown in Figure 13.

Figure 16 is a side view of a form of spreader cap for the coil expansion spring, for use with the pointed form of chuck jaw units shown in Figures 12, 13, 14.

Figures 17 is an end view of the cap of Figure 15.

Figure 18 is an enlarged detail of the spring binder coil as used in the chuck-jaw units shown in Figure 12.

Figure 19 is a detail showing a method of forming a bayonet slot in the tapered end of the splicer for engaging a latch pin mounted laterally on a chuck seated therein.

Figure 20 is an end view showing a chuck having latch pins mounted laterally thereon as referred to in the description of Figure 19.

Figure 21 is a side elevation of the chuck and latch pins shown in Figure 20.

Figure 22 is a detail view of a tubular stem or chuck control for use in the form of assembly illustrated in Figure 13.

Figure 1:
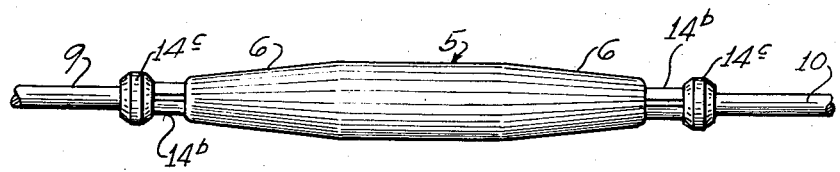
Figure 1 is an elevation of the one-piece holder and splicer, made in accordance with this invention, showing the ends of two wires inserted therein.
Figure 2:
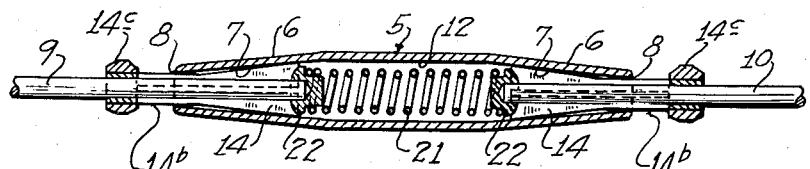
Figure 2 is a longitudinal section of the embodiment of Figure 1.
Figure 3:
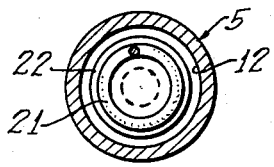
Figure 3 is a central cross section of the embodiment of Figure 1, on an enlarged scale.

In constructing the splicer as shown in Figures 1 and 2, I provide an elongated, one-piece holder 5, made preferably of tubular stock having its ends spun down taperingly as shown at 6 to form the interior conical sockets 7 with end openings 8 through which wires 9 and 10 may be inserted for joining axially. Inasmuch as there are interior parts to be inserted, in such one-piece, tubular construction, the procedure would be to first spin down one end, or form the tapered end with a die, insert the parts properly and then spin down the other end. In such operation the stock is cut long enough to provide a spring housing or sleeve 12 medially between the sockets 7 and merging thereinto.

Figure 4:
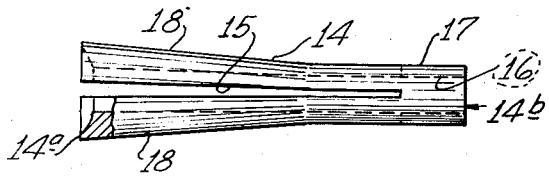
Figure 4 is an enlarged detail of one of the conic-sectional wedges or chucks or chuck-jaw units, on an enlarged scale.
Figure 5:
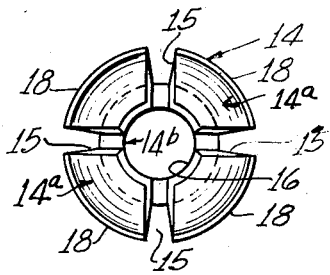
Figure 5 is a view of the larger end of the wedge or chuck assembly of Figure 4.
Figure 6:
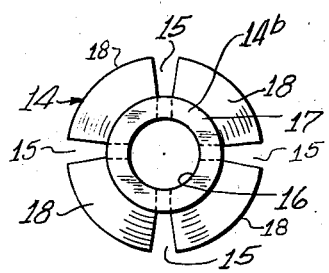
Figure 6 is a view of the smaller tapered end of the wedge or chuck assembly of Figure 4, showing the solid connecting ring integrally joining the several sections.
Figure 7:
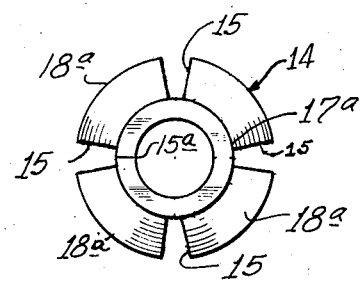
Figure 7 is a tapered end view showing wedge or chuck sections joined by an integral, parted ring, whereby the sections are rendered more expansible. This view is on the scale of Figures 3, 4, 5 and 6.
Figure 8:
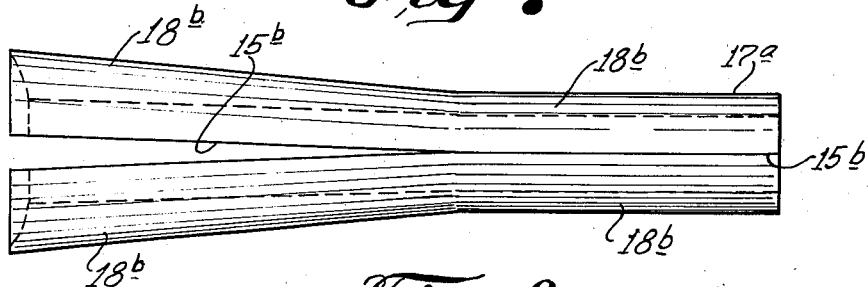
Figure 8 is a detail view of a wedge or chuck made up of free and unconnected conic-sections, on the scale of Figure 7.

Sets of conical or tapered and axially bored wire gripping jaws, chucks or wedges 14 are freely seated, one in each of the end sockets 7, these chucks or jaws being elongated and sectional in structure, somewhat shorter than the sockets in which they are seated so that as they move inwardly into the spring housing 12, they may expand diametrically, and being longitudinally cut or slitted in spaced relation as shown at 15 in Figures 4 and 5 through the flared or butt ends 14a into the central bores 16 and towards but not quite out through the tapered ends 14b, thus leaving integral connecting rings 17 at these ends for resiliently supporting the resulting sections 18. Or one of the slits, as shown at 15a in Figure 7, may be cut clear out through the tapered ends, thus forming parted connecting rings 17a and thereby increasing the lateral expansibility of the sections 18a. Or all of the slits may be extended out through the tapered ends, as shown at 15b in Figure 8, thus entirely separating the sections 18b. However, since it is desirable that the chuck or wedge sections have a definite and set outward inclination at their larger ends, in order to facilitate the release of wires, it is preferable that chucks or wedges of the unitary forms shown, be employed.

These chucks, of whichever form employed, are axially cupped or concaved somewhat at their butts, as shown at 14a, and as mounted in their respective sockets these ends are turned inwardly in opposed and spaced relation, with the spring housing or sleeve 12 intervening.

The smaller tapered ends 14b of the chucks, jaws or wedges are sufficiently reduced and prolonged to substantially and freely protrude out through the tapered or socketed ends of the holder or splicer, as clearly shown in the drawing, and small rings 14c are pressed firmly onto these ends for facilitating manipulation of the wedges or chucks. However, considerable longitudinal play is afforded the chucks through the tapered and protruded ends thereof. A resilient, expansive press element, such as the coil spring 21, is provided, and is fitted at its ends with bevelled spreader-caps 22, formed with reduced annular shoulders 23 for tightly fitting inside the ends of the spring, the centers of the outer faces of the caps or spreaders 22 being punched in or cupped to form sockets 24 of slightly larger diameter than the wire upon which the splicer is designed for use. Additionally these outer faces are bevelled off marginally, as shown at 25, thus forming convexed spreaders complemental to and adapted for co-action with the cupped inner and larger ends 14a of the wedges 14, in the use of the device, for the purpose of releasing connected wires, and as will be explained later. The spring 21 thus capped at its ends is placed under compression within the housing 12, with its spreader caps braced against the flared and cupped ends of the chucks 14.

Figure 9:
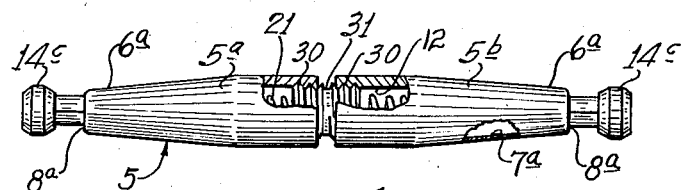
Figure 9 is an elevation of a two-part holder and splicer, showing the inner ends partially separated but engaged by a threaded nipple, upon which they may be screwed together.
Figure 10:
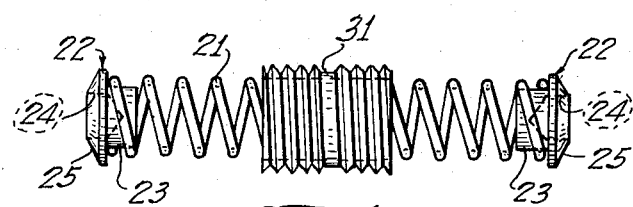
Figure 11:
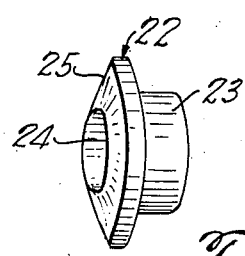
Figure 11 is an enlarged detail of one form of the spreader caps for the ends of the expansion spring.

In constructing the device as shown in Figures 9 and 10, wherein is shown a two-piece or sectional holder for the chucks and spring, the tubular holder 5 comprises the sections 5a and 5b, the outer ends being tapered down as shown at 6a to form the inner sockets 7a with end openings or apertures 8a, and the inner ends of the sections being interiorly threaded as shown at 30. A threaded sleeve or nipple 31 is provided, and the coil spring press element 21 is passed through this nipple, after which the spreader caps 22 are tightly fitted to the ends of the spring in manner already pointed out. The inner diameter of the nipple may be such as to just nicely receive the spring, and the caps 22 of slightly larger diameter, though less than the inner diameter of the spring housing or sleeve 12, thus locking the spring within the nipple. The ends of the spring and of the nipple are then inserted into the threaded ends of the parts of the holder and these parts are turned up firmly together, over the threaded nipple, thus compressing the spring press element and forcing the wedge chucks resiliently to their seats.

Various other modifications of the structural features of the invention may be employed, as deemed expedient.

For example, and as illustrated in Figures 12 to 15, the inner ends of the chuck-jaw units, instead of being uniformly or evenly cupped as shown at 14a in Figure 5, may be angularly notched and pointed or castellated as shown at 14d in Figures 14 and 15, the spreader caps of the spring 21 being complementally notched and pointed but at a more acute angle as shown at 22d in Figures 16 and 17, so that the points of each will intermesh with the notches of the other as the chuck-jaw units are moved inwardly, thus spreading the jaws asunder. Also the inner flared ends of these chuck-jaw units may be circumferentially notched and coil springs 35 mounted therein as shown in Figures 13 and 15. These springs serve as additional means for positively contracting or closing the jaws upon the wires.

As shown in Figures 9 and 10, the sleeve or nipple 31 is mounted exteriorly of the spring 21, this arrangement being necessary in the two-part splicer shown, for threadedly connecting these parts. And in a unitary form of splicer, such as shown in Figures 12 and 13, a sleeve 31a may also be mounted over the spring, if desired, the latter being here indicated at 21a, this arrangement preventing possibility of the spring cramping or buckling under compression, and also serving as a rigid stop for the spreader caps at the ends thereof.

Instead of the unitary construction of chuck-jaws 14 and protruding stems 14b, as shown in Figures 1, 2 and 4, the chuck-jaws may be cut short to fall entirely inside their sockets, as shown at 14d in Figures 13 and 15, and then tubular stems 14e protruded freely out through the ends of the splicer as means for pushing the chuck-jaws inwardly, the inner ends of the stems being flared to contact the inner walls of the tapered sockets, as shown at 14f, thus locking the element slidably in place.

In order to prevent the wires being nicked or broken by the shortened form of jaw (Fig. 15), the outer ends thereof may be flared from the central bore, as shown at 14g. Also the inner faces of any form of jaws shown, may be serrated as shown at 14h, for more effectually gripping the wires to be spliced.

In Figures 19, 20 and 21 is shown a means for releasably latching the chuck-jaw units to their in-thrust positions. For this purpose the walls of the tapered or socketed ends of the splicer are pierced each with a bayonet slot 37, adapted to slidably engage the ends of pins 38 rigidly seated in the inner flared ends of the jaw sections. By forcing the chuck-jaws inwardly and then rotating same, the pins are turned laterally into the angular ends of the slots, thus releasably holding the chucks to their inward positions while wires are being withdrawn.

In the operation and use of this splicer, the wire ends 9 and 10 are inserted into and through the bores of the protruded ends of the wedges or chucks or through the tubular stems, if this form of structure is used, and are pushed inwardly through the chucks until the inner extremities of the wires enter the sockets 24 of the spreader caps 22. In this operation the wedge chucks are also pushed inwardly or retracted, thus allowing them to open or slightly spread apart in the larger portions of the sockets 7, for the full insertion of the wire ends. The wedge chucks 14 are then drawn outwardly by the protruded ends 14b, or by merely pulling outwardly upon the wires, thus causing the chuck sections to contract within their sockets and to grip the wires, and effectually locking them against withdrawal. To release the wires the prolonged ends 14b of the wedge chucks or the protruded stems 14e, are pushed inwardly forcing the concaved ends 14a or the points 14d, into a diametrically larger part of the sockets, against the action of the spring 21, causing the spreader caps 22 or 22d of the spring 21 to force into the flared and cupped ends 14a or pointed ends 14d of the wedge chucks and spread the sections laterally apart. Similarly the spreader caps and spring would function to spread asunder chucks comprising the entirely separated sections 18b.

Thus there is provided a positive means for spreading the wedge sections, and there is also provided a handy and self contained means for manipulating the device for releasing wires.

While there is here shown and described certain preferred embodiments of the invention, the structural details thereof may be changed or modified within the scope of the appended claims.

I claim:

1. A releasable wire splicer, comprising an elongated tubular holder having a central, diametrically enlarged spring-housing merging into tapered end sockets reversely positioned and tapered out end-wise of the holder, collapsible tapered and axially bored chuck-jaw units freely seated in the sockets, the inner butt ends thereof being cupped and flared, a compression spring seated in the central spring housing, spreader caps on the ends of the spring adapted to press into the ends of the chuck-jaw units for opening same diametrically, and means unitarily connected with the assembly for forcing the chuck-jaw units inwardly against the said spring, whereby the jaws are opened admitting or withdrawing wires.

2. A releasable wire splicer, comprising an elongated tubular holder having a central, diametrically enlarged portion and communicating, tapered and reversely positioned end-sockets opening out endwise of the holder; axially bored, tapered, collapsible and expansible chuck-jaw units reversely seated in the end sockets, means in the central portion of the holder for co-acting with co-operative formations of the butt ends of the chuck-jaws for opening same as they are forced inwardly, and means extended out through the ends of the holder for forcing the chuck-jaw units inwardly.

3. A releasable wire splicer, comprising a tubular holder including a relatively large central spring housing merging into reversely positioned conical sockets that taper down and open out end-wise of the holder, conical, axially bored wire gripping chucks freely seated in the sockets, the in-turned larger ends thereof being flared and cupped and the tapered outer ends being prolonged and protruded exteriorly at the ends of the holder, and a resilient press element freely seated within the spring housing of the holder, the ends thereof having outwardly convex spreader caps mounted thereon adapted to press into the cupped ends of the chucks.

4. A releasable wire splicer, comprising an elongated, axially bored holder having interiorly a relatively enlarged central spring sleeve and reversely turned tapered end sockets with end openings for inserting wires; tapered, axially bored compressible and expansible wire gripping elements freely seated therein, the gripping elements having reduced and prolonged end portions protruded freely out through the ends of the holder, whereby the gripping elements may be pushed inwardly of the holder, the flared inner ends thereof being cupped, compression spring within the spring housing and braced between the cupped ends of the gripping elements, and convexed spreader caps on the ends of the spring adapted to enter said cupped ends for expanding them diametrically as the gripping elements are moved inwardly.

5. A wire splicer comprising a tubular holder including a central portion and tapering ends with openings for inserting wires, multiple and tapered jaws located in said tapering ends to grip the wires as the jaws are forced longitudinally outward against said tapering ends, and means forcibly separating the jaws at their inner ends to release the wires as the jaws are moved longitudinally inward away from the tapering ends towards the central portion of the tubular holder.

6. In a structure as defined in claim 5 a compression spring to force the jaws against the tapering ends of the tubular holder.

7. In a structure as defined in claim 5 said means comprised of castellated spreader caps, the castellations being pointed and cooperating with like pointed castellated ends on the jaws to force them apart diametrically at their inner ends as they are moved axially away from the tapered end of the tubular holder.

8. A wire splicer comprising a tubular holder including a central portion and tapering ends with openings for inserting wires, multiple and tapered jaws located in said tapering ends to grip the wires as the jaws are forced longitudinally against said tapering ends, the butt ends of the nested jaws being cupped, a compression spring in the central portion of the holder and braced at its ends against the inner butt ends of the jaws to force same against the tapering ends of the holder, and convexly shaped spreader caps mounted on the ends of the spring and seated in the cupped ends of the jaws, to force the jaws apart diametrically as they are moved axially inward toward the central portion of the holder.

9. In a device as defined in claim 8, the said convexly shaped spreader caps being recessed axially on the convex side to receive the ends of the wires as they are inserted through the jaws, thus preventing the mashed ends of sheared wires from effecting contact of the jaws against the wires.

10. A releasable wire splicer, comprising a two-piece holder of elongated axially bored sections each interiorly threaded at one end, a threaded nipple for threadedly joining the sections endwise, the outer ends of the sections being tapered down to form inner, reversely turned conical sockets with end apertures leading thereinto, relatively short, tapered, axially bored and expansible wire gripping chucks seated in said sockets, the tapered ends of the chucks being so reduced and lengthened as to pass freely and measurably out through the end apertures of the sockets as means for moving the chucks inwardly or outwardly for releasing or gripping wires inserted endwise and axially through the chucks, and an expansible coil spring seated through the central nipple and adapted to be compressed between the inner flared ends of the chucks as the holder sections are screwed together, the relative shortness of the chucks permitting them to move inwardly into diametrically enlarged space for lateral expansion in the process of inserting or releasing wires, the inner flared ends of the chucks being cupped and the coil spring having convexed spreader caps on their ends adapted to enter said cups for assisting their lateral expansion on inward movement.

11. In a releasable wire splicer, a tubular holder with tapered end sockets, complementally tapered wire gripping jaws in the sockets, the inner butt ends thereof being cupped, a resiliently expansible element having convexed spreader caps at its ends mounted centrally in the holder and braced between the inner cupped ends of the jaws for contracting them upon inserted wires, and for forcing the spreader caps into the cupped ends of the jaws for spreading them laterally for releasing the wires.

12. In a device as defined in claim 11, the said convexed spreader caps being recessed axially on their convexed sides to receive the mashed ends of sheared wires and preventing same from interfering with the action of the jaws.

FORD PENNELL.